United States Patent [19]
Di Benedetto

[11] 3,885,148
[45] May 20, 1975

[54] FLASHLIGHT
[75] Inventor: Nicholas Di Benedetto, Brooklyn, N.Y.
[73] Assignee: Lawrence Peska Associates, Inc., New York, N.Y. ; a part interest
[22] Filed: Aug. 3, 1973
[21] Appl. No.: 385,455

[52] U.S. Cl. .......................................... 240/10.66
[51] Int. Cl. .............................................. F21l 7/00
[58] Field of Search ......... 240/10.66, 10.68, 10.6 R, 240/6.42

[56] References Cited
UNITED STATES PATENTS

| | | |
|---|---|---|
| 1,313,516 | 8/1919 | Cantin ..................... 240/10.68 |
| 1,464,573 | 8/1923 | Heise et al. .................. 240/10.66 |
| 2,347,531 | 4/1944 | Yardeny ..................... 240/10.66 X |
| 2,522,012 | 9/1950 | Alexander .................... 240/10.66 X |
| 3,710,092 | 1/1973 | Olbermann, Jr. ............. 240/10.66 X |

*Primary Examiner*—Joseph F. Peters, Jr.
*Attorney, Agent, or Firm*—Richard E. Nanfeldt

[57] ABSTRACT

A flashlight employing cylindrical batteries with a pivotably insertable plate insertable into and out of the flashlight case between the two batteries, the plate acting as a conducting surface between the rear terminal of the battery and the switch. Preferably the switch is a dimmer switch.

5 Claims, 5 Drawing Figures

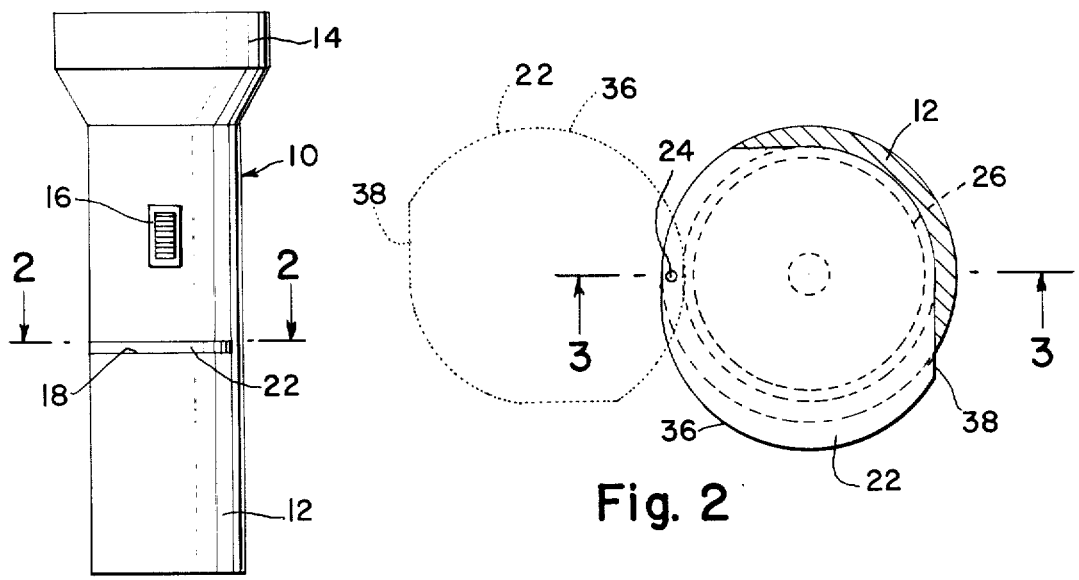
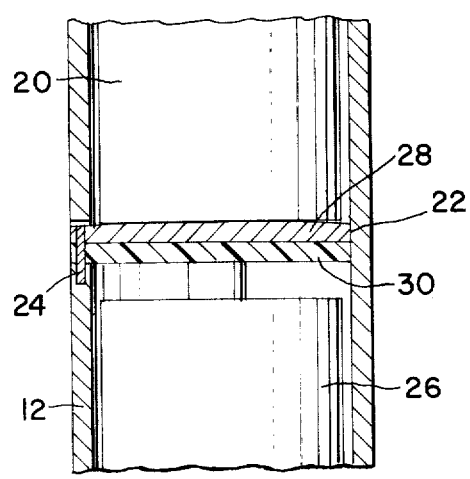
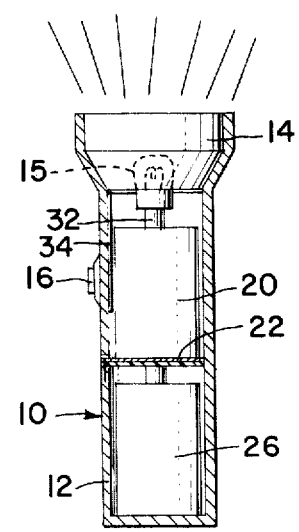
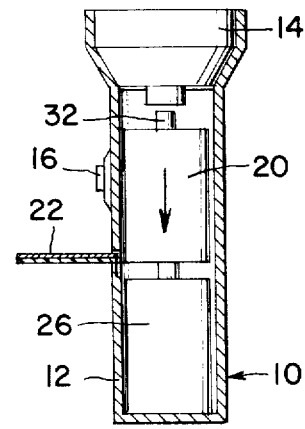
Fig. 1　Fig. 2　Fig. 3　Fig. 4　Fig. 5

FLASHLIGHT

BACKGROUND OF THE INVENTION

The application relates to a portable electrical lamp, more particularly referred to as flashlight. Generally, flashlights are devices which employ (electrical) chemical cells, normally called dry cells or batteries to supply electrical power to an incandescent bulb. Ordinarily such devices come in a great assortment of configurations and employ most available types of batteries. The vast majority of such flashlights employ cylindrically shaped batteries having a positive terminal protruding axially from the face of the cylinder with the base forming the negative terminal. These batteries are well known; are of fixed dimensions; supply about 1.5 volts each, and are classified by their size. Most portable lamps employing such batteries and popularly called flashlights are cylindrical in shape with a reflector in which the incandescent bulb is mounted on one end and a cylindrical case holding any number of batteries. Most such flashlights hold two batteries, but there are flashlights in use holding from one to any convenient number of batteries, though the number is limited by the number needed for the bulb and the convenient length which can be handled by a person. Typical examples of such flashlights are shown by several patents, among which are U.S. Pat. No. 1,609,583 issued Dec. 7, 1926 to S. Sokolow, U.S. Pat. No. 1,688,560 issued Oct. 23, 1928 to H. W. Staples, U.S. Pat. No. 2,804,541 issued Aug. 27, 1957 to O. W. Schotz, U.S. Pat. No. 2,852,632 issued Sept. 16, 1958 to E. J. Garland, U.S. Pat. No. 3,067,324 issued Dec. 4, 1962 to W. C. Thompson and, U.S. Pat. No. 3,261,972 issued July 19, 1966 to F. Stahl.

All these aforesaid patents illustrate different variations of such flashlights and use from one battery, specifically U.S. Pat. No. 3,067,324 to any convenient number. One disadvantage of such flashlights is that the failure of any single battery to conduct electrical current, causes failure of the whole flashlight to operate, while it is not common for the user to have on his person spare batteries for replacement.

SUMMARY OF THE INVENTION

I have therefore invented a novel portable electrical lamp or rather a flashlight employing batteries, which comprises a head holding an incandescent lamp and a cylindrical case capable of holding at least two batteries, and having a transverse cutout slot approximately located adjacent the back of the first battery when mounted in the case. A plate is pivotably mounted on the case and insertable through the cutout in and out of the case. The plate has a conducting surface on its side facing the back of the first battery and a non-conducting face on its other side, thereby providing a removable conducting element between one terminal of the battery and the head of the flashlight. Insertion of the plate into the case allows the flashlight to operate and separates the two batteries in the case, thereby conveniently storing the second battery. A switch is mounted on the case and acts to open or close the electrical conducting path between the plate and the head of the flashlight which acts as the second terminal for the bulb in the socket. Preferably the switch is of the dimmer type which incorporated a restive element to cut the voltage to the bulb if desired as well as a non-resistive on-off path.

Accordingly, it is an object of my invention to provide a flashlight which conveniently stores a spare battery;

Another object of my invention is to provide a flashlight having a selective means of isolating one battery from another;

Still another object of my invention is to provide a flashlight having means for dimming the light.

Other objects and advantages of the flashlight according to my invention will be apparent from the brief description of the drawings and preferred embodiment which follow.

BRIEF DESCRIPTION OF THE DRAWINGS

FIG. 1 of the drawings shows the flashlight in elevation;

FIG. 2 is a transverse cross-sectional view taken along section 2—2 of FIG. 1;

FIG. 3 is a sectional elevation of the approximate middle portion of the flashlight taken along section 3—3 of FIG. 2;

FIG. 4 is a sectional elevation of the flashlight in operational configuration; and FIG. 5 is a sectional elevation of the flashlight in inoperative condition.

DESCRIPTION OF THE PREFERRED EMBODIMENT

Referring now to FIG. 1 of the drawing a flashlight 10 is shown in elevation having a cylindrically shaped case 12 and a head 14 enclosing a lamp 15 (not shown), attached to the top of the case 12. A dimmer switch 16 is mounted in the side of the case 12. A transverse slot 18 is partially cut through the mid point of the case 12 at a point approximately adjacent the rear of a first battery 20 when in contact with the lamp 15.

A plate 22 shown in FIG. 2 of the drawings is pivotably mounted on the flashlight case 12 by means of pin 24 so as to be insertably pivotable into and out of the flashlight case 12 in the manner indicated by the plate 22 in dashed line outside the case and in full line inside the case.

Referring now to FIG. 3 which is a partial cross-sectional view taken along Section 3—3 of FIG. 2, the plate 22 is shown inside the case 12, with the rear surface of the plate in contact with the terminal of a second battery 26. The plate 22 is made of two surfaces, a front surface 28 being made of any suitable electrical conducting material such as aluminum, copper or any metallized surface. The other face of the plate 22 a non-conducting rear surface 30 facing the second battery 26 is made of any suitable electrical non-conducting material such as plastic or rubber. Most preferably the front surface 28 of the plate 22 is of a springlike metallic material of slight convex shaped so as to provide a biasing force, causing the first battery 20 to be in positive contact with the bulb terminal at its front terminal 32.

Referring now to FIG. 4, the flashlight 10 is shown in cutaway operational configuration. The dimmer switch 16 is shown with a conducting strip 34 connecting the switch to the side of the head 14 socket holding the bulb 15 thus showing the complete operational circuit. The size of the case 12 is such so as to accommodate the second battery 26 in the case's lower half. The presence of the plate 22 between the batteries 20 and 26 effectively separate them while completing the circuit and providing the biasing force to the first battery 20 to cause it to come into contact with the bulb terminal.

FIG. 5 of the drawings shows the flashlight 10 in inoperative configuration with the plate pivoted outside the case and the first battery 20 no longer in contact with the bulb 15.

Preferably the switch 16 is a dimmer switch having an incorporated resistive element which can be selectively inserted into the circuit to reduce voltage to the bulb. Also the plate 22 is preferably made with an edge 36 and tip 38 which extends outside of the case 12 when the flashlight is in operational configuration and provides an easily grasped tip 38 or edge 36 for pivoting the plate.

Having thus fully described my invention and wishing to cover these variations and modifications thereof, without departing from the spirit and scope thereof, what is claimed as new is:

I claim:

1. A flashlight employing at least one cylindrical battery of the dry cell type, said flashlight comprising a head having a socket in which a bulb is mounted; a cylindrically shaped case capable of holding at least two batteries, said case having a transverse slot partially cut through a midpoint of said case at a point approximately adjacent to a rear of a first battery in contact with said bulb; a plate pivotally mounted on said case and insertable through said transverse slot; said plate having a conductive surface facing the head and a nonconducting rear surface facing a second battery, and a switch mounted on said case and conductively connected to said plate and said socket.

2. The flashlight of claim 1 wherein said plate comprises a tip extending outside of said case when said plate is inserted into said case, said tip being easily contacted by a fingertip.

3. The flashlight according to claim 1 wherein said plate comprises biasing means for forcing said first battery into contact with the bulb.

4. The flashlight according to claim 1, wherein said switch is a dimmer switch.

5. The flashlight of claim 4 wherein said plate comprises biasing means for forcing said first battery into contact with the bulb.

* * * * *